Figure 1:
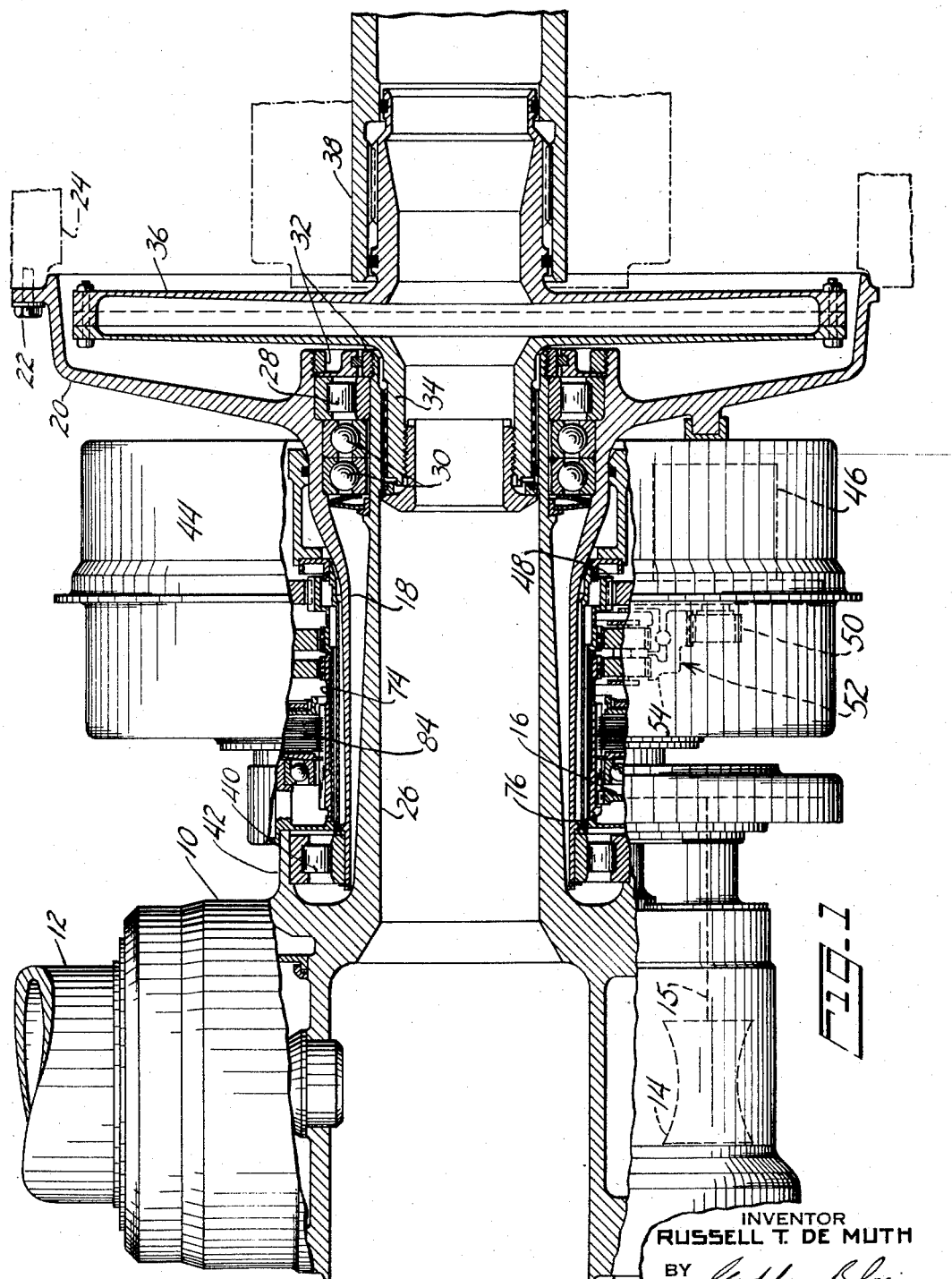

Nov. 18, 1958  R. T. DE MUTH  2,860,714
PROPELLER AUTOMATIC FEATHERING MEANS
Filed April 23, 1954  3 Sheets-Sheet 2

INVENTOR
RUSSELL T. DE MUTH
BY
*Godfrey B. Spein*
ATTORNEY

INVENTOR
RUSSELL T. DE MUTH

United States Patent Office 2,860,714
Patented Nov. 18, 1958

2,860,714
PROPELLER AUTOMATIC FEATHERING MEANS

Russell T. De Muth, Passaic, N. J., assignor to Curtiss-Wright Corporation, a corporation of Delaware Application April 23, 1954, Serial No. 425,179

15 Claims. (Cl. 170—160.13)

This invention relates to aeronautical propellers and is concerned particularly with means by which the blades of a propeller may be feathered automatically, or moved to a higher pitch angle, when the propeller is being driven by the relative wind, rather than driving into the relative wind according to its normally intended function. The need for automatic feathering comes about in modern aircraft which are driven by turbine engines which in turn drive propellers. If an engine failure should occur in flight, the windmilling propeller creates a large amount of draft. Unless reduction in drag of the propeller is effected promptly by feathering an accident could easily occur. An essential object of an automatic feathering system is to have it work more quickly than can be accomplished by the normal manual feathering procedure. A related objective is to make the automatic feathering system as simple as possible and to have it bypass the conventional propeller controls and pitch changing mechanism, to reduce failure possibilities.

In the present invention, I provide for automatic propeller feathering with a minimum of extra mechanisms and devices, and apply power to the propeller blades for feathering thereof at a part of the propeller system which is as close to the blade as possible. I further provide mechanism which can disarm the automatic feathering mechanism so that, when propeller operation is deliberately desired in reverse pitch, the feathering mechanism is inactive. However, at all times when the propeller is operating in its normal forward pitch region, the automatic feathering mechanism is ready for operation upon the occurrence of reverse thrust on the propeller. During this normal forward pitch operation of the propeller, pitch increase and decrease can be accomplished to adjust the power absorption of the propeller to a desired level. The usual types of governors or synchronizers used for controlling engine speeds by means of propeller load are included in the propeller system to which the automatic feathering features are applied and the operation of these devices is not affected by the automatic feathering system.

Figure 2:
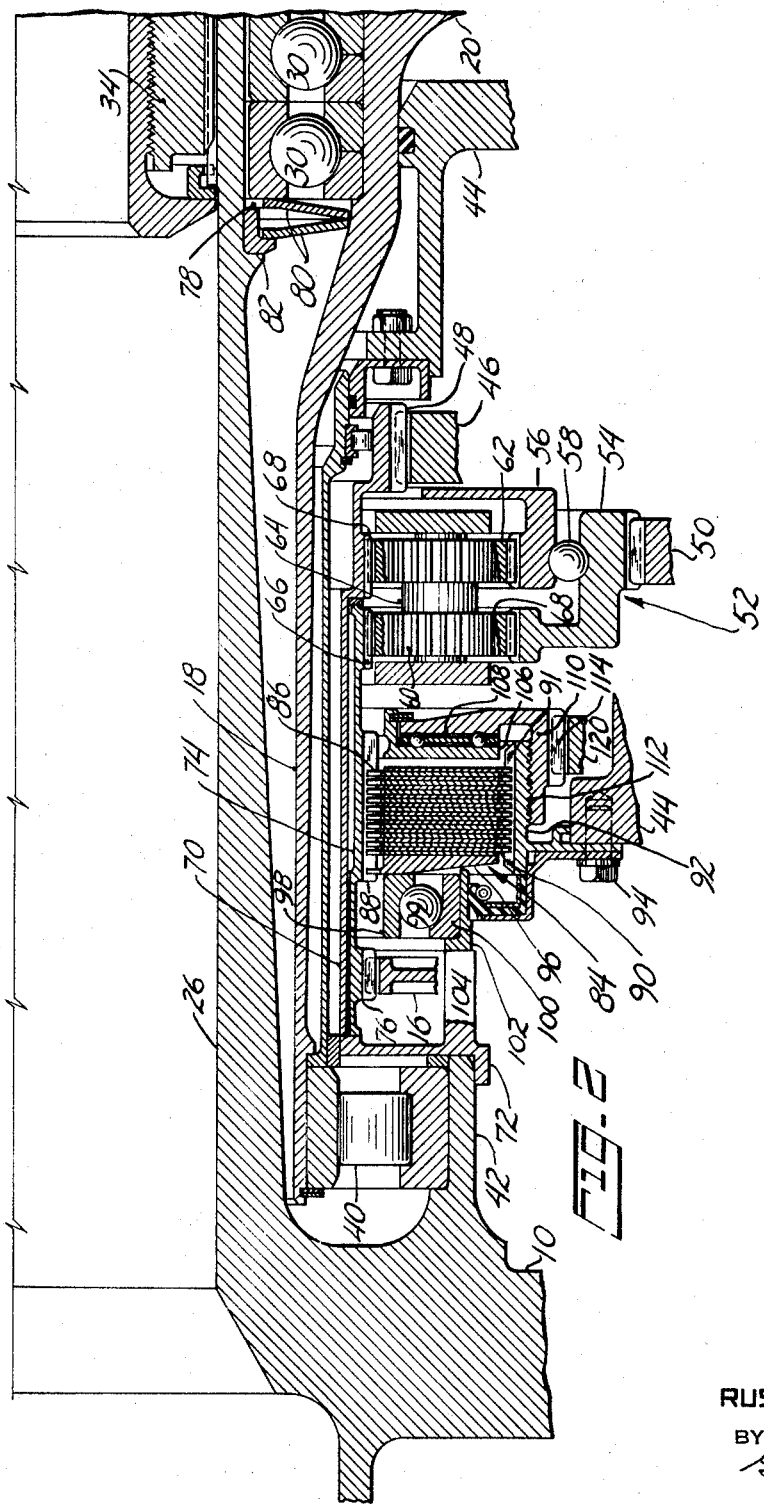
Figure 3:
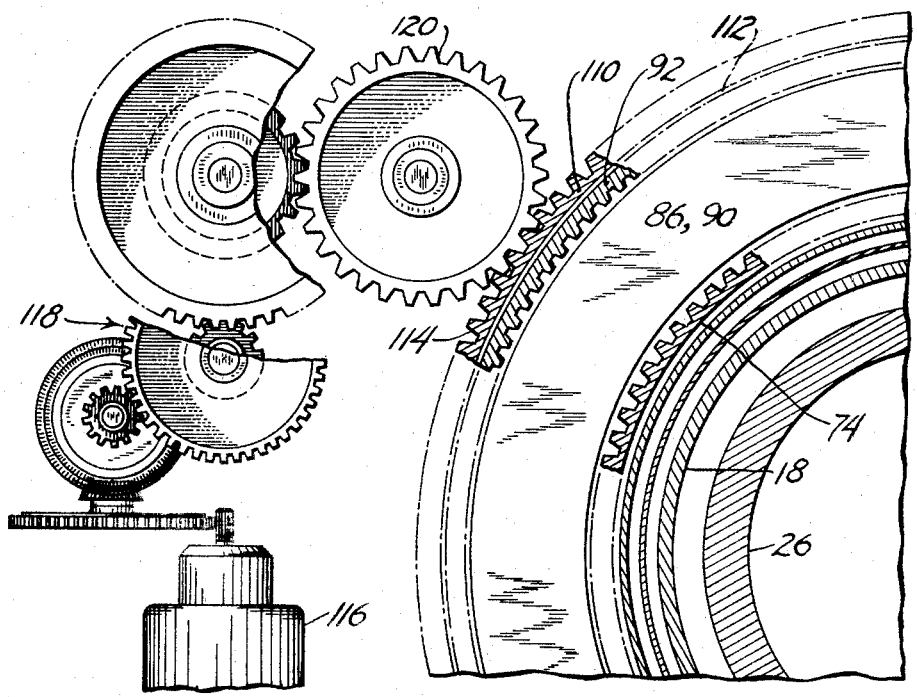
Figure 4:
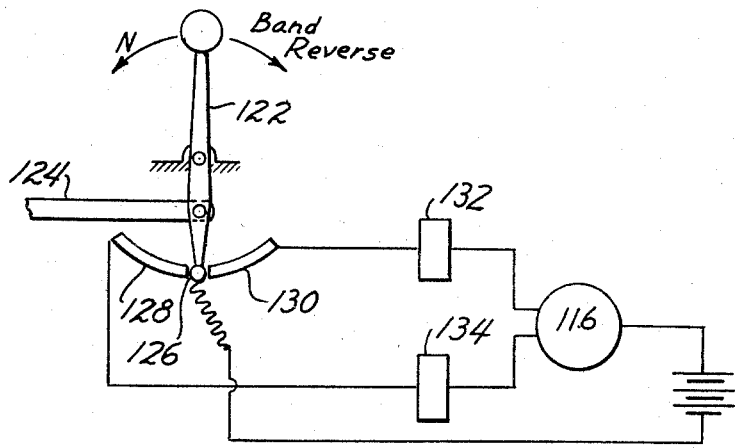

For a better understanding of the invention, reference may be made to the attached drawings wherein similar reference characters designate similar parts and wherein:

Fig. 1 is a fragmentary longitudinal section through a propeller including features of this invention, Fig. 2 is an enlarged fragmentary longitudinal section of a portion of Fig. 1, Fig. 3 is an end elevation, partly in section, taken through part of the mechanism shown in Figs. 1 and 2, and Fig. 4 is a diagram of control for a motor comprising part of the invention.

Referring first to Figure 1, I show a propeller hub end which is provided with a plurality of propeller blades 12 which are journalled in sockets in the hub for pitch change. The inner end of the blades are provided with worm wheels which are engaged by worms in the hub suitably driven rotationally to effect changes in pitch of the propeller blades 12. One of the worms is diagrammatically indicated at 14 and is driven through a shaft 15 by a gear 16 near the inboard end of the propeller hub. The construction of this type of pitch changing drive is well known in the art and need not be further expanded here.

The propeller is mounted on a non-rotating shaft 18 which is integral with a bell shaped member 20 secured as by cap screws 22 to the nose of a reduction gear or engine indicated at 24. The propeller is provided with an integral inboard extention 26 which passes within the shaft 18 and is supported thereon at its inboard end by a radial roller bearing 28. Both forward and rearward thrust of the propeller is assumed by thrust bearings 30 disposed adjacent the bearing 28 and between the inboard end of the shaft 26 and the inboard end of the shaft 18. These bearings are secured in place by appropriate nuts and seals shown at 32. Drive of the propeller shaft extension 26 is afforded through a splined coupling 34, a flexible drive coupling 36, and the power shaft 38 leading from the power plant.

The propeller, at the outboard end of the shaft 18, is supported by a radial roller bearing 40, which is engaged between the outer end of the shaft 18 and an annular flange 42 formed on the rear face of the propeller hub 10. Thus it will be seen that the propeller is supported on the stationary shaft 18 at spaced apart points in order to resist properly bending moments imposed on the shaft by the propeller.

The exterior of the non-rotating shaft 18 forms a convenient mounting for a pitch changing mechanism generally indicated at 44 which is sleeved over the shaft 18. A non-rotating pitch changing mechanism housing 44 contains selectively operable clutches which derive power from the rotation of the propeller. The engaged clutch imposes turning effects upon the pitch changing gears such as 16.

A typical clutch is indicated at 46, the clutch body being driven by a gear 48 rotating with the propeller. When the clutch is engaged, it drives a pinion 50 cooperating with transfer gearing 52 which will be described in conjunction with Figure 2. The propeller incorporates a clutch such as 46 for increasing propeller pitch, another similar clutch rotating in the opposite direction for decreasing propeller pitch, and a brake which operates reciprocally with the clutches, for holding part of the differential transfer gearing 52 stationary to hold the propeller against pitch change. The clutches 46 and the brake above mentioned are not a part of the present invention, such apparatus being shown in the prior art, as, for instance, in Cushman application Serial No. 340,778 filed March 6, 1953, now abandoned, and in Mergen et al. application Serial No. 143,636 filed February 11, 1950, now U. S. Patent No. 2,738,045.

Referring now to Figure 2, the transfer gearing 52 includes a moveable ring gear 54 which is selectively rotatable or fixed by the clutch as 46 or brake (not shown) pinions such as 50. A stationary ring gear is shown at 56, this gear being secured against rotation to the pitch changing mechanism housing 44. To provide a compact transfer gearing, the ring gears 54 and 56 are piloted relative to one another by a ball bearing 58. The gears 54 and 56 cooperate with pinions 60 and 62 journalled separately for rotation on a spider 64, the inner runs of responsive pinions being meshed with sun gears 66 and 68. The gear 68 is rotatable at all times with the propeller, like the gear 48 to which it is attached, these gears being both formed on a sleeve 70 drivably engaging, thru an adapter 72, the propeller hub 10. The gear 66 is carried on a sleeve 74 upon which is formed a gear 76 with which the several gears 16 of the propeller mechanism are engaged. The sleeve 74 is piloted on the sleeve 70 and may rotate therewith, hence with the propeller, or may rotate faster or slower than the sleeve 70.

From the foregoing it will be seen that when the ring gear 54 is held from rotation, the gear 66, its sleeve 74, and the gear 76 will rotate with the propeller at propeller speed. When the gear 54 is rotated in one direction or the other, the sleeve 74 will be rotated in advance of propeller rotation or in retard thereof, thereby turning the gears 16 and effecting pitch changes of the propeller blades 12 through the gear train 14, 15. The transfer gearing is so arranged that when the sleeve 74 lags behind the propeller rotation, pitch increase of the propeller blades will be effected. Conversely, when the sleeve 74 advances rotationally relative to the propeller, the propeller blades will be reduced in their pitch angle.

Under normal operating conditions the ring gear 54 affords control of the propeller blade pitch, through the usual control system. When the propeller is subjected to windmilling or reverse thrust, and when preferably it is in the forward pitch quadrant, prompt automatic pitch increase of the propeller is desired to minimize drag of the propeller upon the airplane. To afford this automatic pitch increase, the following described mechanism is provided.

As has been described, the propeller shaft 26 passes within the stationary shaft 18 and is secured by bearings 40, 30, and 28. Clearance 78 is provided adjacent to the thrust bearings 30 which permits the propeller shaft 26 to move axially a slight amount within the stationary shaft 18. One or more Belleville washers 80 are disposed between an inner race of one of the bearings 30 and a shoulder 82 formed on the shaft 26. These washers, acting as springs, normally urge the propeller to a forward position relative to the stationary shaft 18. Upon the occurrence of reverse thrust of sufficient force to displace the Belleville washers 80, the propeller shaft 26 will move rearwardly or to the right as shown in Figure 2 through a portion of the distance established by the clearance 78. This axial movement is used to energize a special pitch increasing clutch or brake generally designated as 84. The clutch 84 comprises a series of friction discs 86 having splined holes therein, the splines of the disc being engaged with splines 88 formed on the exterior of the sleeve 74. Interleaved with the discs 86 is another set of discs 90 whose outside rims are provided with splines engaged with corresponding splines 91 formed on the inside of a drum 92. The drum 92 is secured against axial and rotational movement by cap screws 94 engaging a part of the pitch changing mechanism housing 44.

The leftward clutch plate 86 of the stack is engaged by a pressure plate 96 part of which is engaged by the inner race 98 of a thrust bearing 99. The outer race of the bearing 99, as at 100, is contained within a cup 102 engaged by struts 104 which are in turn engaged with the flange 42 on the right end of the propeller hub. The bearing 99 comprises a thrust bearing, and when the propeller moves axially in a rightward direction as shown, the bearing transmits axial motion and moves the clutch pressure plate 96 to the right, thereby squeezing the stack of plates 86 and 90 together in a rightward direction. An adjustable abutment 106 is provided at the right hand end of the stack of plates 86, 90. This abutment 106 bears against a nut member 110 through a thrust bearing 108, whereby the members 106 and 110 may rotate freely with respect to each other. When the abutment 106 is in a leftward position, the clutch plates 86, 90, are frictionally engaged with one another when pressure plate 96 is pushed thereagainst. When the propeller is exerting forward thrust, the pressure plate 96 disengages the plates 86, 90.

The abutment 106 may be moved out of engagement with the stack of plates when the emergency pitch increasing mechanism is to be inactivated, as when reverse pitch for the propeller blades is deliberately desired. To this end, the nut member 110 is screw-threaded on the outside of the drum 92, the member 110 carrying a gear 114 on its outer rim. As member 110 is rotated on the screw threads 112, it is moved either to right or left according to the direction of the rotation. Means are included, as shown in Figure 3, to rotate the nut member 110, selectively, by a small motor 116. This motor drives the gear 114 through a reduction gear train 118 as noted, the output gear 120 of which engages the gear 114. The motor 116 is reversible and is provided with limit switches so that the abutment 106 can be moved to its right or left extreme position, either to disable or to activate the brake or clutch 84. When activated, the clutch 84 is normally disengaged when the propeller is producing forward thrust, but engages when the propeller moves rightwardly under the influence of reverse thrust.

Under normal conditions, the brake 84 is in a position ready for operation. Its torque capacity is sufficient to increase the pitch of the propeller blades even though part of the normal control mechanism may be engaged or in operation. That is, the brake capacity is sufficient to overpower the other mechanisms which are furnished to provide normal blade pitch control. As inferred previously, the brake 84 is inactivated when reverse pitch operation of the propeller is deliberately selected. Thus, the brake 84 will not accomplish any pitch change on propeller blades even though the propeller may be in the rightward position as noted in Figure 2, with respect to the stationary propeller shaft 18.

In Fig. 4, the motor 116 is shown as reversible for arming and disarming the abutment 106 into and from positions for enabling the brake 84 to engage. A propeller control lever 122 actuates the conventional propeller control mechanism and pitch changing mechanism through a link 124, and in addition carries a contact 126 engageable with segments 128 or 130. The former is active during control of the propeller in the reverse and blade angle control regimes, while the latter is active during control of the propeller in the normal forward thrust governing regime. Segments 128 and 130 are connected through limit switches 132 and 134 respectively to windings of the motor 116, which respectively, when energized, cause motor rotation to retract the brake abutment 106, and motor rotation in the other direction to advance the abutment 106.

Through the mechanism above described, it will be seen that the objectives of the invention are accomplished. That is, automatic pitch increase or feather is at all times available under normal propeller operating conditions, in case there should be a failure of some part of the normal propeller control mechanism and in case reverse thrust moves the propeller in an inboard direction. The system is shown as applied to a tractor propeller. For a pusher propeller, transposition of parts is considered to be within the scope of those skilled in the art.

Although one embodiment of the invention is shown, it is to be understood that the invention may be applied in various forms and in various environments. Changes may be made in the arrangement shown without departing from the spirit of the invention. Reference should be had to the appended claims for definition of the limits of the invention.

What is claimed is:

1. In an aeronautical propeller having a hub and blades locatable therein for pitch change, a non rotating structure and a shaft on which the propeller is rotatably mounted, said propeller having freedom for limited axial movement on said shaft, a sleeve rotatable on the propeller, coaxial with the shaft, normally rotatable with the propeller and operably connected to said blades to control their pitch, means to rotate said sleeve slower than the propeller to increase propeller blade pitch, brake plates rotatable with said sleeve, non rotative brake plates mounted on the structure interleaved with said rotatable plates, an abutment on and axially movable with the propeller engageable with one end of the stack of plates, an adjustable abutment for the other end of the stack of plates, and means selectively operable to move said adjustable abutment toward and away from said plates.

2. In an aeronautical propeller having a hub and blades locatable therein for pitch change, a non rotating structure and a shaft on which the propeller is rotatably mounted, said propeller having freedom for limited axial movement on said shaft, a sleeve rotatable on the propeller, coaxial with the shaft, normally rotatable with the propeller and operably connected to said blades to control their pitch, means to rotate said sleeve slower than the propeller to increase propeller blade pitch, brake plates rotatable with said sleeve, non rotative brake plates mounted on the structure interleaved with said rotatable plates, an abutment on and axially movable with the propeller engageable with one end of the stack of plates, an adjustable abutment for the other end of the stack of plates, and means selectively operable to move said adjustable abutment toward and away from said plates, said abutment being moveable to one position where said brake plates are engaged upon rearward axial movement of said propeller on said shaft, but where said brake plates are not engaged upon forward axial movement of said propeller on said shaft, and to another position where said brake plates are disengaged regardless of the axial movement of said propeller on said shaft.

3. In an aeronautical propeller having a hub and blades locatable therein for pitch change, a non rotating structure and a shaft on which the propeller is rotatably mounted, said propeller having freedom for limited axial movement on said shaft, a sleeve rotatable on the propeller, coaxial with the shaft, normally rotatable with the propeller and operably connected to said blades to control their pitch, means to rotate said sleeve slower than the propeller to increase propeller blade pitch, brake plates rotatable with said sleeve, non rotative brake plates mounted on the structure interleaved with said rotatable plates, an abutment on and axially movable with the propeller engageable with one end of the stack of plates, an adjustable abutment for the other end of the stack of plates, and means selectively operable to move said adjustable abutment toward and away from said plates, said abutment being moveable to one position where said brake plates are engaged upon rearward axial movement of said propeller on said shaft, but where said brake plates are not engaged upon forward axial movement of said propeller on said shaft, and to another position where said brake plates are disengaged regardless of the axial movement of said propeller on said shaft, said abutment also being selectively moveable to engage said brake plates regardless of the axial position of said propeller on said shaft.

4. In an aeronautical propeller having a hub and blades locatable therein for pitch change, a non rotating structure and a shaft on which the propeller is rotatably mounted, said propeller having freedom for limited axial movement on said shaft, a sleeve rotatable on the propeller, coaxial with the shaft, normally rotatable with the propeller and operably connected to said blades to control their pitch, means to rotate said sleeve slower than the propeller to increase propeller blade pitch, brake plates rotatable with said sleeve, non rotative brake plates mounted on the structure interleaved with said rotatable plates, an abutment on and axially movable with the propeller engageable with one end of the stack of plates, an adjustable abutment for the other end of the stack of plates, means selectively operable to move said adjustable abutment toward and away from said plates to positions where the plates are engageable and not engageable respectively as a result of the said limited axial movement of the propeller on said shaft, and resilient means urging said propeller toward its forward axial position on said shaft.

5. In an aeronautical bladed propeller, means for mounting said propeller for rotation, a member rotatable with and with respect to said propeller drivably connected to the propeller blades, means operable under normal conditions to rotate said member in selected direction relative to the propeller to increase and decrease propeller blade pitch, a brake comprising a non-rotatable element and an element secured for rotation with said member and engageable with said first element, said elements being engageable to deter rotation of said member and means to engage said elements to deter rotation of said member and to increase propeller blade pitch responsive to reverse or negative thrust on said propeller and connected to said propeller and brake.

6. In an aeronautical bladed propeller, means for mounting said propeller for rotation, a member rotatable with and with respect to said propeller drivably connected to the propeller blades, means operable under normal conditions to rotate said member in selected direction relative to the propeller to increase and decrease propeller blade pitch, a brake comprising a non-rotatable element and an element secured for rotation with said member and engageable with said first element, said elements being engageable to deter rotation of said member, said propeller being mounted for free limited fore and aft movement, means movable fore and aft with said propeller engageable with one of said elements upon aft propeller movement, such fore and aft movement respectively causing disengagement and engagement of said elements.

7. In an aeronautical bladed propeller, means for mounting said propeller for rotation, a member rotatable with and with respect to said propeller drivably connected to the propeller blades, means operable under normal conditions to rotate said member in selected direction relative to the propeller to increase and decrease propeller blade pitch, a brake comprising a non-rotatable element and an element secured for rotation with said member and engageable with said first element, said elements being engageable to deter rotation of said member, said propeller being mounted for free limited fore and aft movement, means movable fore and aft with said propeller engageable with one of said elements upon aft propeller movement, such fore and aft movement respectively causing disengagement and engagement of said elements, and said brake including an abutment normally positioned to enable engagement of said brake elements, and positionable to leave said brake elements free of engagement upon aft propeller movement, and means selectively operable connected to shift said abutment to one or the other position.

8. In an aeronautical bladed propeller, means for mounting said propeller for rotation, a member rotatable with and with respect to said propeller drivably connected to the propeller blades, means operable under normal conditions to rotate said member in selected direction relative to the propeller to increase and decrease propeller blade pitch, a brake comprising a non-rotatable element and an element secured for rotation with said member and engageable with said first element, said elements being engageable to deter rotation of said member, said propeller being mounted for free limited fore and aft movement, means movable fore and aft with said propeller, an abutment normally positioned to be engaged by certain of said brake elements to assist in enforcing engagement of said brake upon aft propeller movement, and selectively operable means connected to move said abutment axially between said normal position and a position wherein the brake is not engaged upon aft propeller movement.

9. In an aeronautical bladed propeller, means for mounting said propeller for rotation and for limited axial movement, a blade pitch changing member rotatable with and with respect to the propeller, a plurality of brake plates splined on said member, a plurality of non-rotating brake plates interleaved with the first plates, a thrust member axially movable with the propeller and engageable upon rearward axial propeller movement to press upon one end of the stack of said plates, a pressure member engageable with and disposed at the other end of said stack of plates, and selectively operable means connected to move said pressure member toward and away from said stack of plates.

10. In an aeronautical bladed propeller, means for mounting said propeller for rotation and for limited axial movement, a blade pitch changing member rotatable with and with respect to the propeller, a plurality of brake plates splined on said member, a plurality of non-rotating brake plates interleaved with the first plates, a thrust member axially movable with the propeller and engageable upon rearward axial propeller movement to press upon one end of the stack of said plates, a pressure member engageable with and disposed at the other end of said stack of plates, selectively operable means connected to move said pressure member toward and away from said stack of plates, a reverse and forward pitch selector, and means connected to and actuated by said selector when adjusted to forward pitch to adjust said selectively operable means to move said pressure member toward the stack of plates, and by said selector when adjusted to reverse pitch to adjust said selectively operable means to move said pressure member away from said stack of plates.

11. In an aeronautical bladed propeller, means for mounting said propeller for rotation and for limited axial movement, a blade pitch changing member rotatable with and with respect to the propeller, a plurality of brake plates splined on said member, a plurality of non-rotating brake plates interleaved with the first plates, a thrust member axially movable with the propeller and engageable upon rearward axial propeller movement to press upon one end of the stack of said plates, a pressure member engageable with and disposed at the other end of said stack of plates, selectively operable means connected to move said pressure member toward and away from said stack of plates, a reverse and forward pitch selector, and means connected to and actuated by said selector when adjusted to forward pitch to adjust said selectively operable means to move said pressure member toward said stack of plates, said selectively operable means comprising a screw-shift mechanism including said pressure member and a rotatable threaded nut for translating said pressure member.

12. In an aeronautical bladed propeller, means for mounting said propeller for rotation and for limited axial movement, a blade pitch changing member rotatable with and with respect to the propeller, a plurality of brake plates splined on said member, a plurality of non-rotating brake plates interleaved with the first plates, a thrust member axially movable with the propeller and engageable upon rearward axial propeller movement to press upon one end of the stack of said plates, a pressure member engageable with and disposed at the other end of said stack of plates, selectively operable means connected to move said pressure member toward and away from said stack of plates, a reverse and forward pitch selector, means connected to and actuated by said selector when adjusted to forward pitch to adjust said selectively operable means to move said pressure member toward the stack of plates, and by said selector when adjusted to reverse pitch to adjust said selectively operable means to move said pressure member away from said stack of plates, said selectively operable means comprising a screw-shift mechanism including said pressure member and a rotatable threaded nut for translating said pressure member, and a reversible electric motor geared to rotate said nut.

13. In an aeronautical propeller having variable pitch blades, journalled on a shaft for rotation and mounted on said shaft for slight axial movement, a member on the propeller normally rotatable therewith, rotatable faster than the propeller to decrease the pitch of the blades and rotatable slower than the propeller to increase the pitch of the blades, a brake comprising an element rotatable with said member and a non-rotating element, said elements being engageable at times whereby the non-rotating element slows the rotating element, and means connecting said rotatable brake element with said propeller to move the element toward engagement with the non-rotating brake element in response to rearward axial movement of the propeller on its shaft.

14. In an aeronautical propeller having variable pitch blades, journalled on a shaft for rotation and mounted on said shaft for slight axial movement, a member on the propeller normally rotatable therewith, rotatable faster than the propeller to decrease the pitch of the blades and rotatable slower than the propeller to increase the pitch of the blades, a brake comprising an element rotatable with said member and a non-rotating element, said elements being engageable at times whereby the non-rotating element slows the rotating element, means connecting said rotatable brake element with said propeller to move the element toward engagement with the non-rotating brake element in response to rearward axial movement of the propeller on its shaft and means selectively operable to move said non-rotating brake element toward and away from the other brake element, respectively to condition the brake elements for engagement and to prevent engagement thereof upon rearward axial movement of the propeller on its shaft.

15. In an aeronautical bladed propeller, means for mounting said propeller for rotation and for limited axial movement, a blade pitch changing member with and with respect to the propeller, a brake element secured to the member, a non-rotating brake element engageable at times by the first brake element, a thrust member axially movable with the propeller and engageable upon rearward axial propeller movement to press said first brake element toward engagement with said non-rotatable brake element, a reaction member engageable by said non-rotating element and disposed on the opposite side thereof from said first brake element, and selectively operable means connected to move said reaction member toward and away from said brake elements.

References Cited in the file of this patent

UNITED STATES PATENTS

| | | |
|---|---|---|
| 1,980,272 | Havill et al. | Nov. 13, 1934 |
| 2,405,488 | Briner | Aug. 6, 1946 |
| 2,640,552 | Chillson | June 2, 1953 |